United States Patent
Carlisle et al.

(10) Patent No.: US 7,233,443 B1
(45) Date of Patent: Jun. 19, 2007

(54) ARRANGEMENT FOR WDM MULTIPLEXING AND DEMULTIPLEXING

(75) Inventors: Clinton B. Carlisle, Palo Alto, CA (US); Jahja I. Trisnadi, Cupertino, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 146 days.

(21) Appl. No.: 10/327,357

(22) Filed: Dec. 20, 2002

(51) Int. Cl.
*G02B 5/18* (2006.01)
*G02B 6/34* (2006.01)
*H04J 14/02* (2006.01)

(52) U.S. Cl. ............... 359/571; 359/572; 385/37; 398/87

(58) Field of Classification Search ........... 359/566, 359/569, 571, 572, 130, 124, 15, 34; 385/24, 385/37, 132, 49; 398/78, 87, 81, 84; 356/333, 356/334
See application file for complete search history.

(56) References Cited

U.S. PATENT DOCUMENTS

| 5,119,454 | A | * | 6/1992 | McMahon | ............ 385/49 |
| 5,917,625 | A | * | 6/1999 | Ogusu et al. | ............ 385/24 |
| 6,278,534 | B1 | * | 8/2001 | Arns | ............ 359/15 |
| 6,823,106 | B2 | * | 11/2004 | Takushima et al. | ............ 385/24 |

* cited by examiner

*Primary Examiner*—Audrey Chang
(74) *Attorney, Agent, or Firm*—Okamoto & Benedicto LLP

(57) ABSTRACT

An arrangement for dispersing light comprises a blazed diffraction grating and a mirror. The blazed diffraction grating comprises a grating plane and a multiplicity of blazed facets. Each blazed facet is oriented at a blaze angle to the grating plane. The mirror couples to the blazed diffraction grating and is oriented parallel to the blazed facets. The arrangement permits a highly dispersive optical function in a very compact structure with low polarization dependent loss.

14 Claims, 5 Drawing Sheets

ARRANGEMENT FOR WDM MULTIPLEXING AND DEMULTIPLEXING

FIELD OF THE INVENTION

This invention relates to the field of optics. More particularly, this invention relates to the field of optics where light is dispersed.

BACKGROUND OF THE INVENTION

Diffraction gratings disperse light. A blazed diffraction grating disperses light into a single order. The diffraction gratings are used in devices such as spectrometers and scanning monochromators. The diffraction gratings are also used in WDM (wavelength division multiplex) optical communication. In the WDM optical communication, multiple wavelengths of light each carry a communication signal. Each of the multiple wavelengths of light forms a WDM channel. In DWDM (dense WDM) optical communication, a subset of the WDM optical communication, the WDM channels are spaced close together. A typical DWDM application operates at a wavelength band about 1,550 nm, has 90 channels, and has spacing of about 0.4 nm between adjacent channels. In the WDM optical communication, the diffraction gratings are used to demultiplex and to multiplex the WDM channels.

The diffraction gratings used in the WDM optical communication suffer from several deficiencies. A first deficiency is that the diffraction gratings produce a relatively small angular dispersion for adjacent WDM channels. In order to distinctly separate the WDM channels, the relatively small angular dispersion leads to a need for a long optical path. A second deficiency is that reflective diffraction gratings having a fine ruling density tend to exhibit polarization dependent loss, which can exceed 1 dB.

What is needed is a method of dispersing light that disperses light with a dispersion which is greater than what is available with a blazed diffraction grating.

What is needed is a method of dispersing light that disperses light with a dispersion which is greater than what is available with a blazed diffraction grating and which also reduces polarization dependent loss.

SUMMARY OF THE INVENTION

Embodiments of the present invention include an arrangement for dispersing light. The arrangement for dispersing light comprises a blazed diffraction grating and a mirror. The blazed diffraction grating comprises a grating plane and a multiplicity of blazed facets. Each blazed facet is oriented at a blaze angle to the grating plane. The mirror couples to the blazed diffraction grating.

DETAILED DESCRIPTION OF THE EMBODIMENTS

Figure 1:
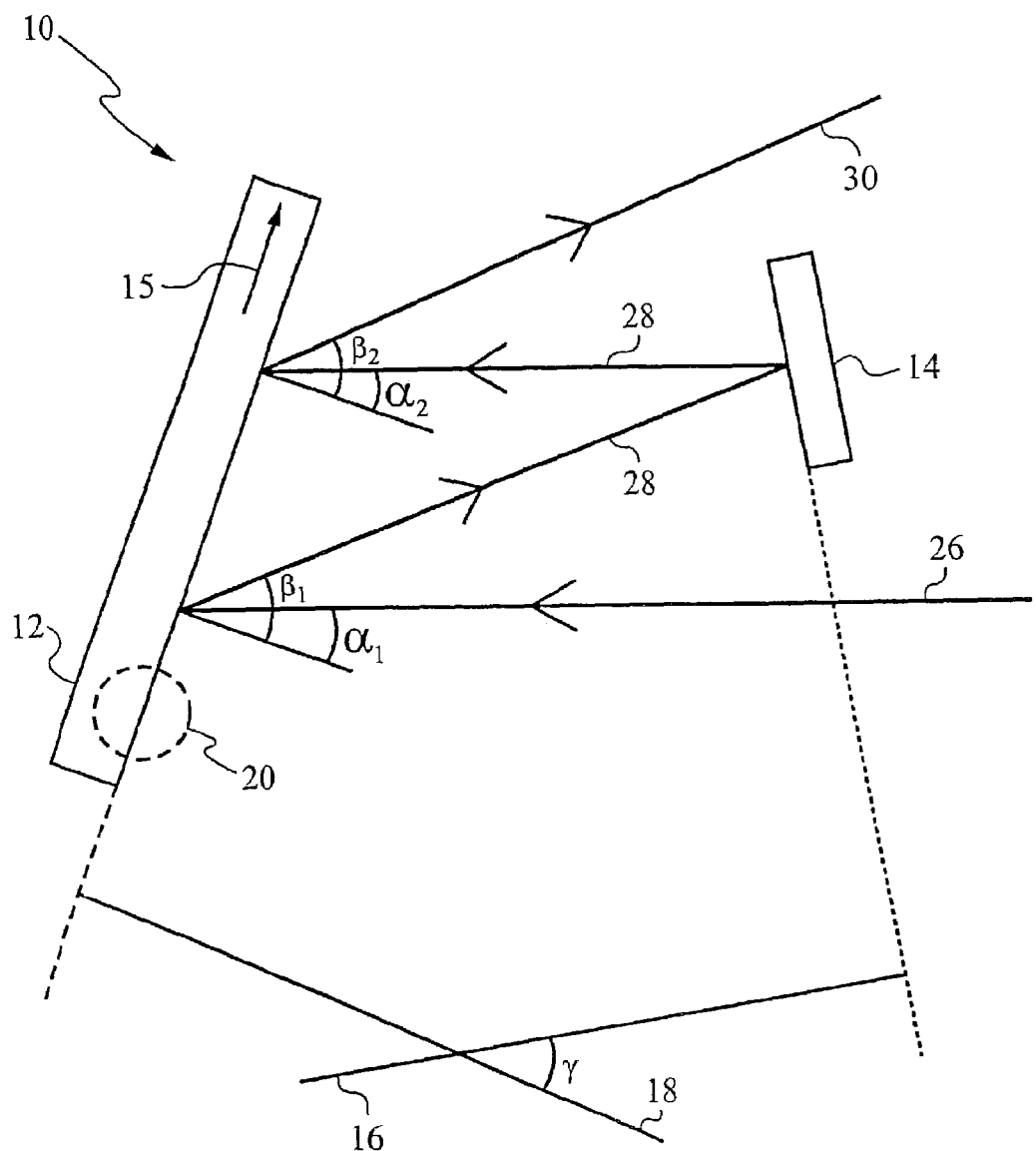
FIG. 1 illustrates the preferred light dispersion arrangement of the present invention.

The preferred light dispersion arrangement of the present invention is illustrated in FIG. 1. The preferred light dispersion arrangement 10 comprises a blazed diffraction grating 12 and a mirror 14. A blaze arrow 15 indicates a blaze direction for the blazed diffraction grating 12. The mirror 14 couples to the blazed diffraction grating 12. A mirror normal 16 and a grating normal 18 are coplanar. The angel between the mirror normal 16 and the grating normal 18 is $\gamma$.

Figure 2:
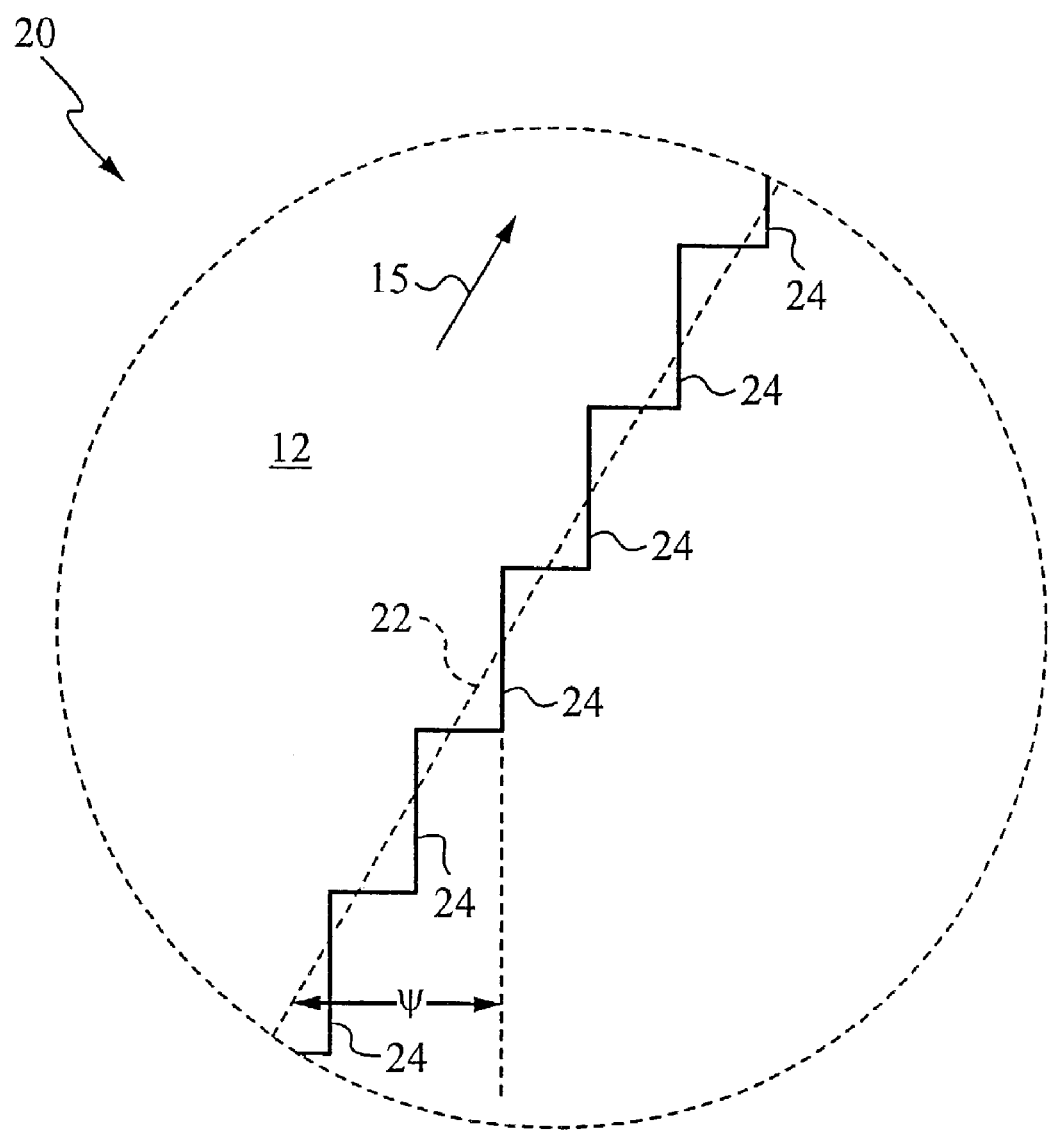
FIG. 2 illustrates blazed facets of a blazed diffraction grating of the preferred light dispersion arrangement of the present invention.

A portion of the blazed diffraction grating 12 is further illustrated in FIG. 2. The portion 20 of the blazed diffraction grating 12 comprises a grating plane 22 and blazed facets 24. The blazed facets 24 are at a blaze angle $\psi$ relative to the grating plane 22.

Referring to FIG. 1, in operation, collimated light 26 is directed onto the blazed diffraction grating 12 at a first incidence angle $\alpha_1$. The blazed diffraction grating 12 diffracts the collimated light 26 into a first diffraction angle $\beta_1$, which forms first diffracted light 28. The mirror 14 reflects the first diffracted light 28 back to the blazed diffraction grating 12. The first diffracted light 28 is incident upon the blazed diffraction grating 12 at a second incidence angle $\alpha_2$. The blazed diffraction grating 12 diffracts the first diffracted light 18 into a second diffraction angle $\beta_2$, which forms second diffracted light 30.

It will be readily apparent to one skilled in the art that the first diffracted light 28 and the second diffracted light 30 depict light of a particular wavelength and that light of other wavelengths will diffract at angles other than the first and second diffraction angles, $\beta_1$ and $\beta_2$.

Figure 3:
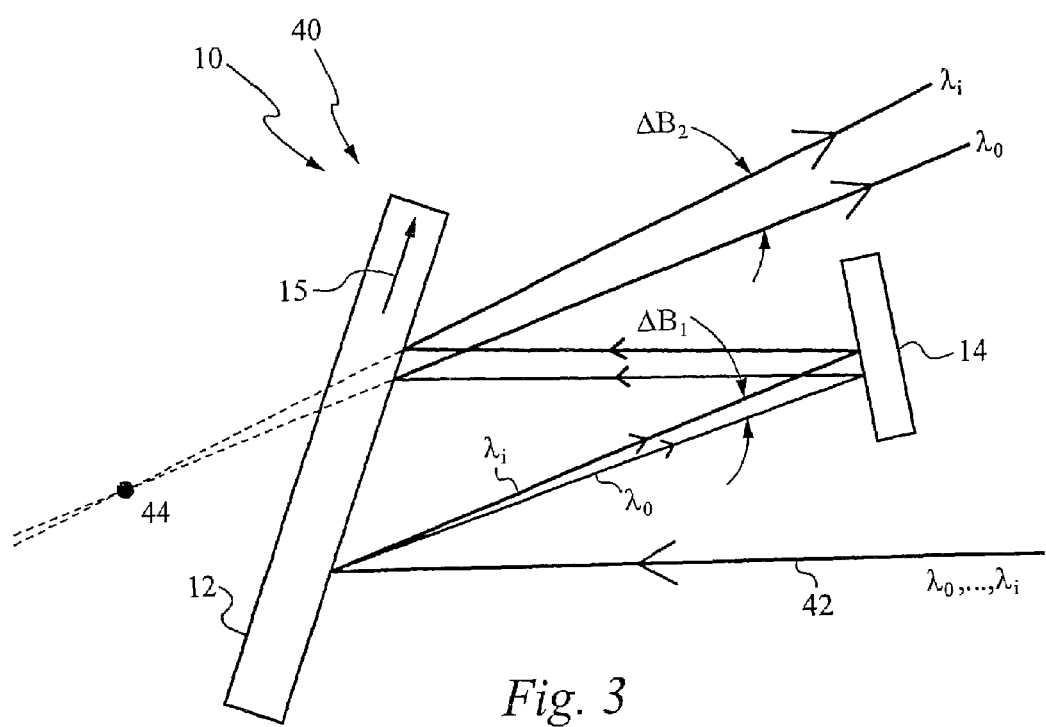
FIG. 3 illustrates the preferred light dispersion arrangement of the present invention demultiplexing multiple WDM channels.

A demultiplexing application of the preferred light dispersion arrangement 10 of the present invention is illustrated in FIG. 3. In the demultiplexing application 40, a range of WDM channels ranging from a zeroth wavelength channel $\lambda_0$ to an ith wavelength channel $\lambda_i$ are incident upon the blazed diffraction grating 12 as a collimated beam 42. The blazed diffraction grating 12 diffracts the range of WDM channels, which disperses the range of WDM channels into a first range of diffracted angles $\Delta\beta_1$. The mirror 14 reflects the range of WDM channels back to the blazed diffraction grating 12. The blazed diffraction grating 12 further disperses the range of WDM channels into a second range of diffracted angles $\Delta\beta_2$. Effectively, the second range of diffracted angles $\Delta\beta_2$ appear to be originating from a virtual point 44.

For a 1,550 nm WDM wavelength band, a maximum ruling density for the blazed diffraction grating 10 is about 1290 lines/mm. Because of a small width of the blazed facets 24 (FIG. 2), polarization loss at the maximum ruling density of 1290 lines/mm is at a maxima. The preferred light dispersion arrangement 10 allows use of a more modest ruling density of 600 lines/mm, which because of a double pass of the blazed diffraction grating 12 produces an effective ruling density of about 1,200 lines/mm. This is close to the maximum ruling density. Also, because a width of the blazed facets 24 is larger than the small width associated with the maximum ruling density, the effective ruling density of 1,200 lines/mm is accompanied by less polarization dependent loss than the polarization dependent loss found with the maximum ruling density. A quarter-wave plate can be used to compensate for polarization dependent loss of an originally large polarization dependent loss grating; however, this results in reduced throughput.

Figure 4:
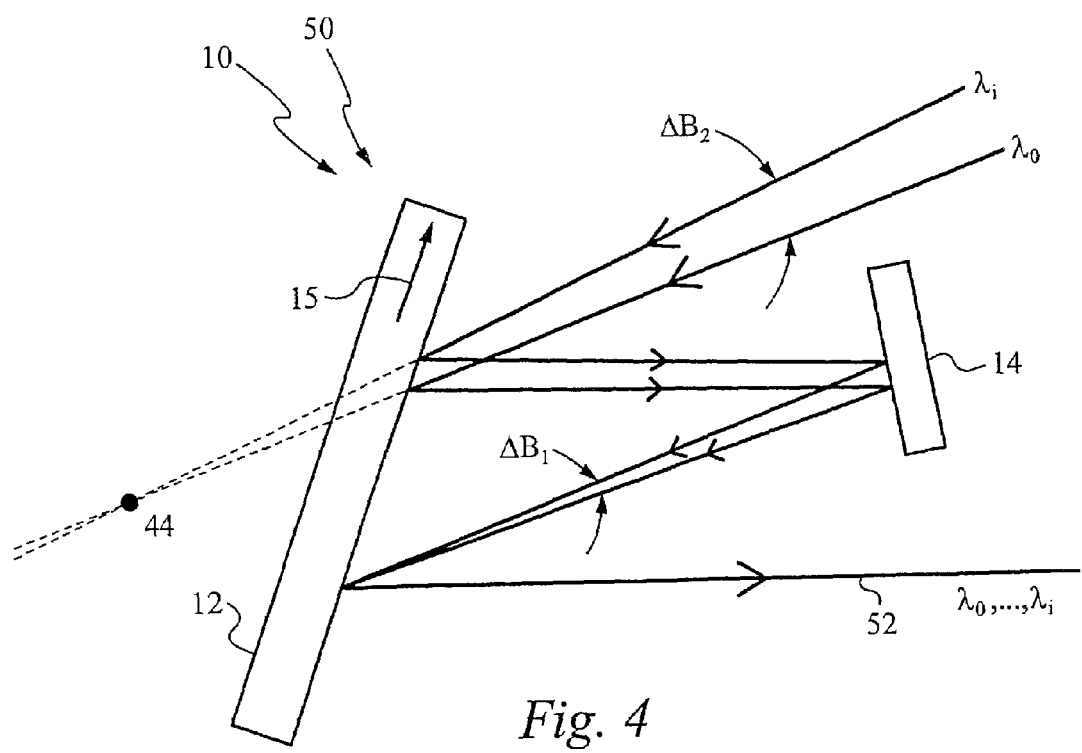
FIG. 4 illustrates the preferred light dispersion arrangement of the present invention multiplexing the multiple WDM channels.

A multiplexing application of the preferred light dispersion arrangement 10 of the present invention is illustrated in FIG. 4. In the multiplexing application 50, the range of WDM channels ranging from the zeroth wavelength channel $\lambda_0$ to the ith wavelength channel $\lambda_i$ are incident upon the blazed diffraction grating 12 at the second range of dispersion angles $\Delta\beta_2$. The blazed diffraction grating 12 reduces the dispersion of the range of WDM channels, which places the range of WDM channels into the first range of diffracted angles $\Delta\beta_1$. The mirror 14 reflects the range of WDM channels back to the blazed diffraction grating 12. The blazed diffraction grating 12 then collimates the range of WDM channels into a output beam 52.

Figure 5:
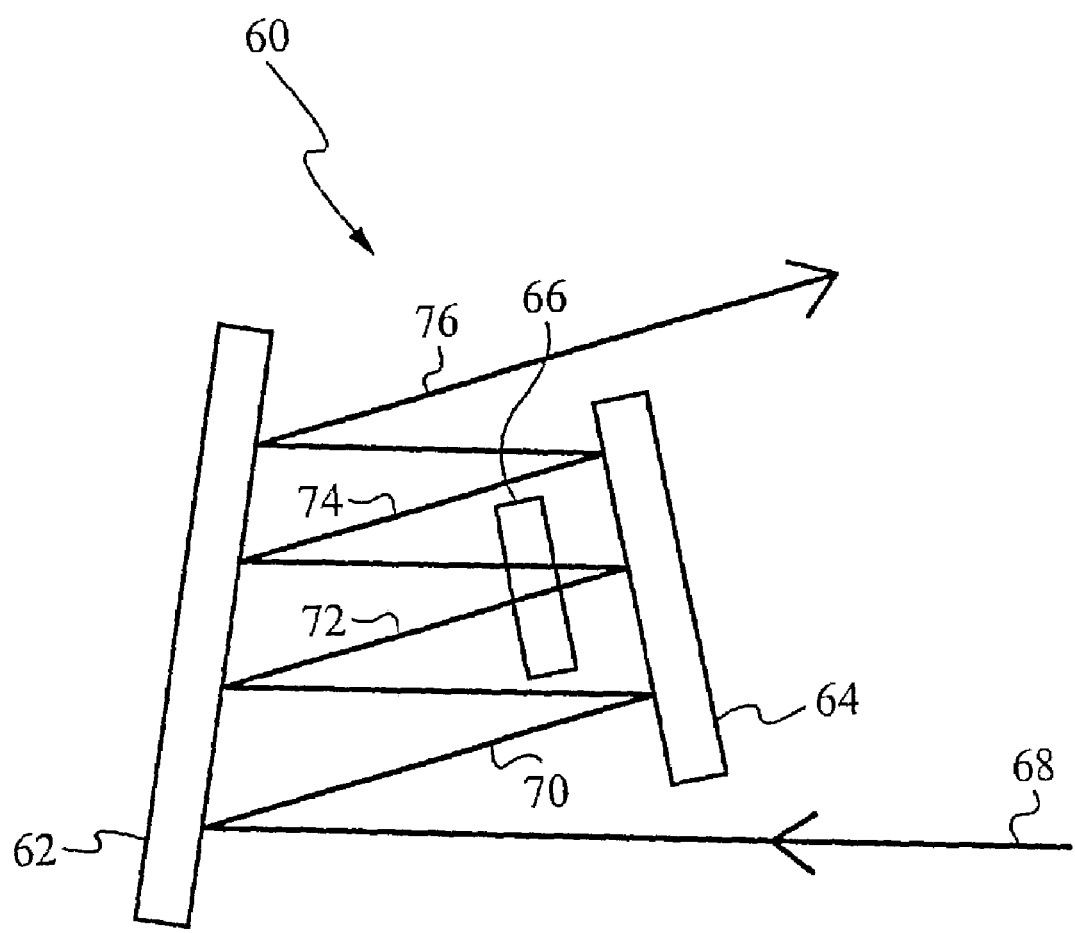
FIG. 5 illustrates an alternative light dispersion arrangement of the present invention.

An alternative light dispersion arrangement of the present invention is illustrated in FIG. 5. The alternative light dispersion arrangement 60 comprises an alternative blazed diffraction grating 62, an alternative mirror 64, and a quarter wave plate 66. In operation, collimated light 68 is directed onto the alternative blaze grating 62, which diffracts the collimated light 68 forming first diffracted light 70. The alternative mirror 64 reflects the first diffracted light 70 back to the alternative blaze diffraction grating 62. The alternative blazed diffraction 62 grating diffracts the first diffracted light 70 forming second diffracted light 72. The alternative mirror 64 reflects the second diffracted light 72 back to the alternative blazed diffraction grating 62. The alternative blazed diffraction grating 62 diffracts the second diffracted light 72 forming third diffracted light 74. The alternative mirror 64 reflects the third diffracted light 74 back to the alternative blazed diffraction grating 62. The alternative blazed diffraction 62 grating diffracts the third diffracted light 74 forming fourth diffracted light 76.

In the alternative light dispersion arrangement 60, the quarter wave plate 66 rotates a polarization of the second diffracted light 72 on its way from the alternative blazed diffraction grating 62 to the alternative mirror 64 and also on its way from the alternative mirror 64 back to the alternative blazed diffraction grating 62. This double rotation of the polarization by the quarter wave plate 66 produces an orthogonal rotation of a particular polarization of the second diffracted light 72. By orienting an optical axis of the quarter wave plate to orthogonally rotate the polarization which experiences a worst polarization dependent loss, the polarization dependent loss is minimized.

Similarly, in an alternative embodiment to the demultiplexing and multiplexing applications described in relation to FIGS. 3 and 4, respectively, a quarter wave plate can be introduced between the blazed diffraction grating 12 and the mirror 14 to intersect the range of WDM channels as they are diffracted from blazed diffraction grating 12 to the mirror 14 and also as they are reflected from the mirror 14 to the diffraction grating 12. By intersecting the range of WDM channels twice, the quarter wave plate provides an orthogonal rotation of the polarization of each channel, which minimizes polarization dependent loss. Alternatively, a half wave plate can be introduced between the blazed diffraction grating 12 and the mirror 14 to either intersect the range of WDM channels as they are diffracted from blazed diffraction grating 12 to the mirror 14 or as they are reflected from the mirror 14 to the diffraction grating 12.

It will be readily apparent to one skilled in the art that other various modifications may be made to the embodiments without departing from the spirit and scope of the invention as defined by the appended claims.

We claim:

1. An arrangement for dispersing light comprising:
    a. a blazed diffraction grating comprising a grating plane and a continuous series of adjacent blazed facets, each blazed facet oriented at a blaze angle to the grating plane; and
    b. a single mirror coupled to the blazed diffraction grating and oriented towards the blazed diffraction grating in a fixed manner,
        wherein the blazed diffraction grating causes incident light to be dispersed by a series of diffractions comprising at least four diffractions from the blazed diffraction grating, and
        wherein after each diffraction, except a last diffraction in the series, the diffracted light is returned to the blazed diffraction grating by reflection from the single mirror.

2. The arrangement of claim 1 wherein the incident light comprises collimated light.

3. The arrangement of claim 2 wherein the collimated light comprises a wavelength band.

4. The arrangement of claim 3 wherein the wavelength band comprises a plurality of wavelengths.

5. The arrangement of claim 4 wherein the plurality of wavelengths comprises a 1,550 nm wavelength band.

6. The arrangement of claim 1, further comprising a quarter wave plate coupling the mirror to the blazed diffraction grating, the quarter wave plate rotating a polarization of the diffracted light by the diffracted light passing through the quarter wave plate twice prior to the last diffraction in the series.

7. An arrangement for dispersing light comprising:
    a. a blazed diffraction grating comprising a grating plane and a continuous series of adjacent blazed facets, each blazed facet oriented at a blaze angle to the grating plane;
    b. a single mirror coupled to the blazed diffraction grating and oriented towards the blazed diffraction grating in a fixed manner such that in operation the blazed diffraction grating causes incident light to be dispersed by a series of diffractions comprising at least four diffractions from the blazed diffraction grating, wherein after each diffraction, except a last diffraction in the series, the diffracted light is returned to the blazed diffraction grating by reflection from the single mirror; and
    c. a quarter wave plate coupling the mirror to the blazed diffraction grating, the quarter wave plate rotating a polarization of the diffracted light by the diffracted light passing through the quarter wave plate twice before the last diffraction in the series.

8. The arrangement of claim 7 wherein the collimated light comprises a wavelength band.

9. The arrangement of claim 8 wherein the wavelength band comprises a plurality of wavelengths.

10. The arrangement of claim 9 wherein the plurality of wavelengths comprises a 1,550 nm wavelength band.

11. An arrangement for dispersing light comprising:
    a. a blazed diffraction grating comprising a grating plane and a continuous series of adjacent blazed facets, each blazed facet oriented at a blazed angle to the grating plane;
    b. a single mirror coupled to the blazed diffraction grating and oriented towards the blazed diffraction grating in a fixed manner; and
    c. collimated light incident upon a portion of the blazed diffraction grating, the blazed diffraction grating causing the collimated light to be dispersed by a series of diffractions comprising at least four diffractions from the blazed diffraction grating, wherein after each diffraction, except a last diffraction in the series, the diffracted light is returned to the blazed diffraction grating by reflection from the single mirror.

12. The arrangement of claim 11 wherein the collimated light comprises a wavelength band.

13. The arrangement of claim 12 wherein the wavelength band comprises a plurality of wavelengths.

14. The arrangement of claim 13 wherein the plurality of wavelengths comprises a 1,550 nm wavelength band.

* * * * *